(12) United States Patent
Allen et al.

(10) Patent No.: US 7,345,576 B2
(45) Date of Patent: Mar. 18, 2008

(54) METHOD AND APPARATUS FOR RESOLVING RFID-BASED OBJECT TRAFFIC TRANSACTIONS TO A SINGLE CONTAINER IN THE PRESENCE OF A PLURALITY OF CONTAINERS

(75) Inventors: Barry Allen, Kelowna (CA); Sharon Barnes, Kelowna (CA); Christopher Adamson, Kelowna (CA)

(73) Assignee: Identec Solutions Inc., Kelowna (CA)

( * ) Notice: Subject to any disclaimer, the term of this patent is extended or adjusted under 35 U.S.C. 154(b) by 201 days.

(21) Appl. No.: 11/007,326

(22) Filed: Dec. 9, 2004

(65) Prior Publication Data

US 2005/0128055 A1    Jun. 16, 2005

Related U.S. Application Data

(60) Provisional application No. 60/528,193, filed on Dec. 10, 2003.

(51) Int. Cl.
*H04Q 5/22* (2006.01)
(52) U.S. Cl. .................................. 340/10.2; 340/572.4
(58) Field of Classification Search ............... 340/10.2, 340/10.1, 572.1, 572.4; 235/437
See application file for complete search history.

(56) References Cited

U.S. PATENT DOCUMENTS

| | | | |
|---|---|---|---|
| 5,500,651 A * | 3/1996 | Schuermann | 342/42 |
| 5,648,765 A * | 7/1997 | Cresap et al. | 340/10.4 |
| 5,680,459 A | 10/1997 | Hook et al. | |
| 5,686,902 A | 11/1997 | Reis et al. | |
| 5,742,237 A * | 4/1998 | Bledsoe | 340/825.49 |
| 5,886,634 A * | 3/1999 | Muhme | 340/572.1 |
| 5,920,287 A | 7/1999 | Belcher et al. | |
| 6,097,301 A * | 8/2000 | Tuttle | 340/693.9 |
| 6,313,737 B1 * | 11/2001 | Freeze et al. | 340/10.1 |
| 6,380,894 B1 | 4/2002 | Boyd et al. | |
| 6,552,661 B1 | 4/2003 | Lastinger et al. | |
| 6,557,238 B1 | 5/2003 | Becherucci et al. | |

FOREIGN PATENT DOCUMENTS

CA          2081752          7/1999

* cited by examiner

*Primary Examiner*—Edwin C. Holloway, III
(74) *Attorney, Agent, or Firm*—Antony C. Edwards (57) ABSTRACT

A method for resolving RFID-based object traffic transactions to a single container in the presence of a plurality of containers, where the method includes the steps of: monitoring RFID object traffic transactions to a single container amongst a plurality of containers wherein the traffic transactions are between at least one RFID reader and a plurality of detected RFID tags detected by the at least one RFID reader; calculating a cumulative and weighted data set for each detected RFID tag of the RFID tags; and, comparing the data set for each detected RFID tag with the data set for other of the detected RFID tags and identifying one RFID tag of the detected RFID tags having a greatest cumulative weight calculated for its corresponding data set so as to resolve multiple detections and identifications of the detected RFID tags in the object traffic transactions to the single container.

16 Claims, 6 Drawing Sheets

METHOD AND APPARATUS FOR RESOLVING RFID-BASED OBJECT TRAFFIC TRANSACTIONS TO A SINGLE CONTAINER IN THE PRESENCE OF A PLURALITY OF CONTAINERS

CROSS REFERENCE TO RELATED APPLICATION

This application claims priority from U.S. Provisional Patent Application No. 60/528,193 filed Dec. 10, 2003 entitled Method for Resolving RFID-Based Object Traffic Transactions to a Single Container in the Presence of a Plurality of Containers.

FIELD OF THE INVENTION

This invention relates to the field of radio frequency identification systems and in particular to a system employing radio frequency identification readers and tags in a networked environment wherein a processor calculates and compares a weighted data set to resolve multiple tag reads in object traffic transactions to a single container in the presence of a plurality of containers.

BACKGROUND OF THE INVENTION

Radio frequency identification (RFID) systems have been proposed for identifying tagged objects for such purposes as taking inventory or tracking movements of objects being transported. Examples are described in U.S. Pat. Nos. 6,097,301, 5,300,875; 5,365,551; and 5,448,110.

As known in the prior art, and as described by Tuttle in his U.S. Pat. No. 6,097,301 entitled RF Identification System with Restricted Range which issued Aug. 1, 2000, RFID systems generally employ a passive or active RF transceiver, called a "tag", mounted on each object to be identified or tracked.

Conventional RFID systems provide little or no interactive feedback in response to actions for example those performed by human operators. Specifically, conventional RFID systems lack any means for discriminating in favor of an individual tagged object that a human operator is working with at any given moment; instead, conventional RFID systems generally would confuse the operator by providing information regarding all the tagged objects in the vicinity. Furthermore, if a number of personnel are working close to each other, conventional RFID systems cannot direct information about a tag to the specific individual who is handling the tagged object.

For example, suppose a number of postal personnel are sorting or routing tagged packages according to the destination encoded in a tag attached to each package. Conventional RFID systems lack any means for detecting which individual package a human handler is about to pick up so as to provide to the operator only the destination or routing information for the package that person currently is handling, to the exclusion of information about other nearby packages.

SUMMARY OF THE INVENTION

In summary, the present invention may be characterized in a first aspect as a method for resolving RFID-based object traffic transactions to a single container in the presence of a plurality of containers, where the method comprises the steps of:

a) monitoring RFID object traffic transactions to a single container amongst a plurality of containers wherein the traffic transactions are between at least one RFID reader and a plurality of detected RFID tags detected by the at least one RFID reader, b) calculating a cumulative and weighted data set for each detected RFID tag of the plurality of detected RFID tags, and c) comparing the data set for the each detected RFID tag with the data set for other of the detected RFID tags and identifying one RFID tag of the detected RFID tags having a greatest cumulative weight calculated for its corresponding data set so as to resolve multiple detections and identifications of the detected RFID tags in the object traffic transactions to the single container.

The data set may include in one embodiment, not intended to be limiting, the following data for each detected RFID tag: radio frequency signal strength, an incremental count of the number of the RFID tag detections and identifications, and the corresponding clock time for each count in the incremental count. In other embodiments the data set may also or alternatively include one or more of the following data: geographic coordinates, for example global positioning satellite (GPS) coordinates; temperature, pressure, various sensed voltage levels, etc.

The data in the data set may be equally or differentially weighted, depending on the application of the method which in turn will determine a different set of weighting or business process rules. For example, in the example elaborated below of a postal handling application, the business process rules for that application may indicate that advantageously the data is, in order of most important to least important, weighted by the signal strength, the incremental count, and the corresponding clock time. This, however, is just one example.

The method may further include the step of mounting the at least one RFID reader on at least one container of the plurality of containers. Conversely, the method may also include the step of mounting the RFID reader adjacent, for example directly on the clothing of a person sorting objects into the plurality of containers, and mounting the RFID tags on the plurality of containers. The method may also include the step of adding to the data set data from an object detection sensor. The method may also include the step of mounting the object detection sensor on each of the RFID tags.

In a further aspect, the present invention may be characterized as a system including devices for resolving RFID-based object traffic transactions to a single container in the presence of a plurality of containers, wherein the system includes:

a) at least one RFID reader and a plurality of RFID tags detectable by the reader, b) means for monitoring RFID object traffic transactions to a single container amongst a plurality of containers wherein the traffic transactions are between the at least one RFID reader and the plurality of detected RFID tags detected by the at least one RFID reader, c) processing means for calculating a cumulative and weighted data set for each detected RFID tag of the RFID tags, d) processing means for comparing the data set for the each detected RFID tag with the data set for other of the detected RFID tags and identifying one RFID tag of the detected RFID tags having a greatest cumulative weight calculated for its corresponding the data set so as to resolve multiple detections and identifications of the detected RFID tags in the object traffic transactions to the single container.

The weighted data set may include in one embodiment at least the following data for each detected RFID tag: radio frequency signal strength, an incremental count of the number of the RFID tag detections and identifications, and the corresponding clock time for each count in the incremental count. As stated above, in one example, the data may be, in order of most important to least important, weighted by the signal strength, the incremental count, and the corresponding clock time. The data set may also advantageously include data from an object detection sensor, for example a motion detector sensor. The object detection sensor may be mounted on each RFID reader, or may be mounted on each of the RFID tags. In one embodiment, the RFID readers interrogate the RFID tags for the identification of the tags.

BRIEF DESCRIPTION OF THE DRAWINGS

FIGS. 2-4 are logic flow charts according to one embodiment of the present invention wherein

DETAILED DESCRIPTION OF EMBODIMENTS OF THE INVENTION

As stated above, Radio Frequency Identification (RFID) tags are electronic devices that communicate via radio transmissions. As discussed in U.S. Pat. No. 6,563,417 which issued May 13, 2003 to Shaw for an invention entitled Interrogation, Monitoring and Data Exchange Using RFID Tags, incorporated herein by reference, RFID Tags may be programmed to be intelligent or just respond with a simple identification (ID) to radio frequency interrogations, and, by virtue of their communications links, are a tool to aid automation. The use of RFID technology may result in having many, even hundreds or thousands of RFID tags concurrently within radio communication range with a single RFID tag interrogator or reader. However, it is frequently important to correctly and automatically associate a business transaction to a specific RFID tag, that is, without human intervention.

RFID architectures are designed to maximize the probability that RFID tags are correctly read. Business processes using RFID may depend on quickly reading all the RFID tags that are within a given RFID read zone. Further, it is impossible given current state of the art to accurately control the extent of the read zone for RFID tags, notwithstanding the attempts of Tuttle and others in the prior art. This presents a problem when the business process requires that a specific tag be associated to an event when potentially many tags are inside the read zone.

In the prior art, Tuttle gives the example of baggage handling in an airport. In a comparable example, a postal worker must load packages into bulk containers, the packages and the bulk containers both having destinations written on them—each bulk container then going to a different destination. In a conventional postal environment, the bulk containers are arranged side-by-side in a "U" shape around the worker. The business process in this example requires validation that the worker placed the package in the correct bulk container. The validation must occur automatically without changing how the worker ordinarily completes the task.

This example only describes one specific problem where the method of the present invention applies to provide a solution, but this is not intended to be limiting as the method of the present invention provides a generic solution to similar problems in many instances in the use of RFID tags as would be known to one skilled in the art.

A solution according to the present invention of the problem outlined in the postal example may be achieved using RFID tags and readers together with software algorithms and, in some instances, sensors attached to RFID tags.

Figure 1:
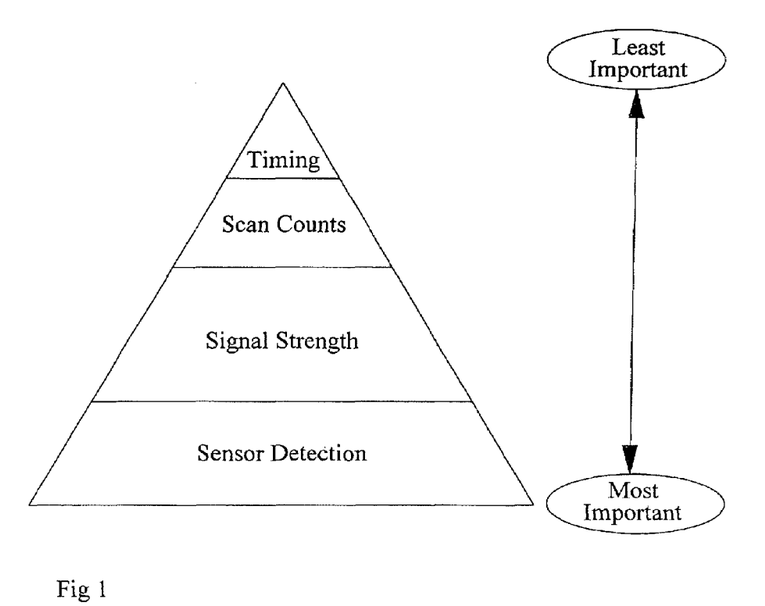
FIG. 1 is a diagrammatic illustration of a logical pyramid applied to the weighting of data in the method according to one illustrative example the present invention.
Figure 2:
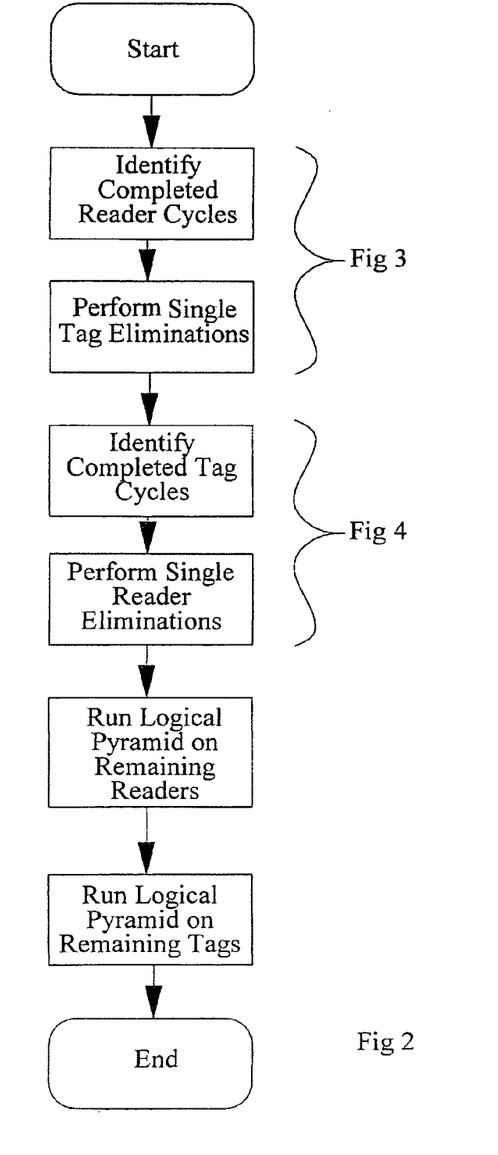
FIG. 2 is a flow chart of the overall algorithm.
Figure 3:
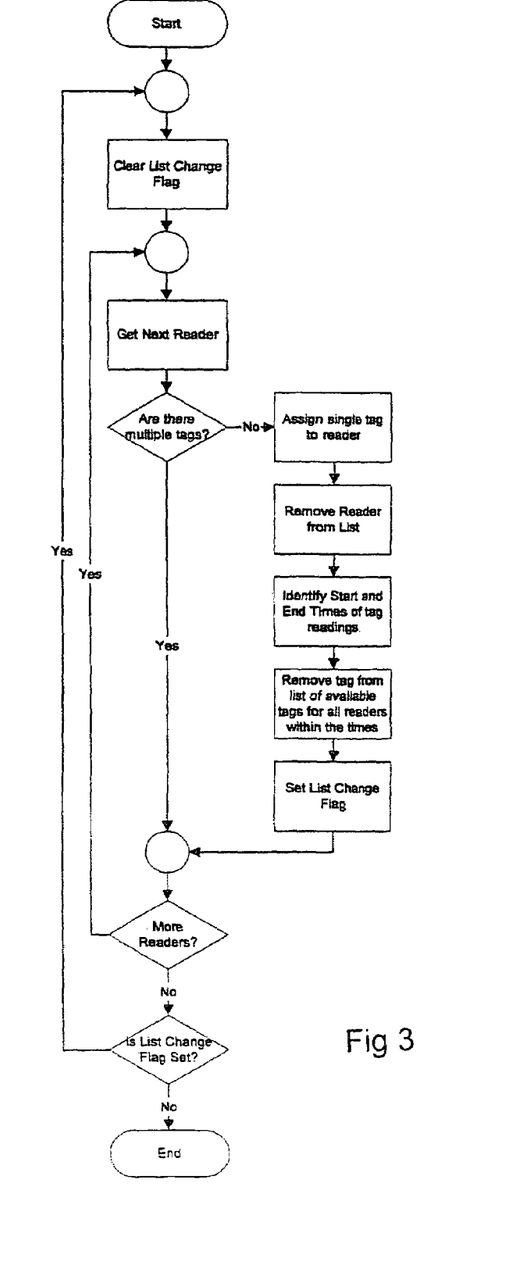
FIG. 3 is a single RFID tag elimination subroutine in the flow chart of FIG. 2.
Figure 4:
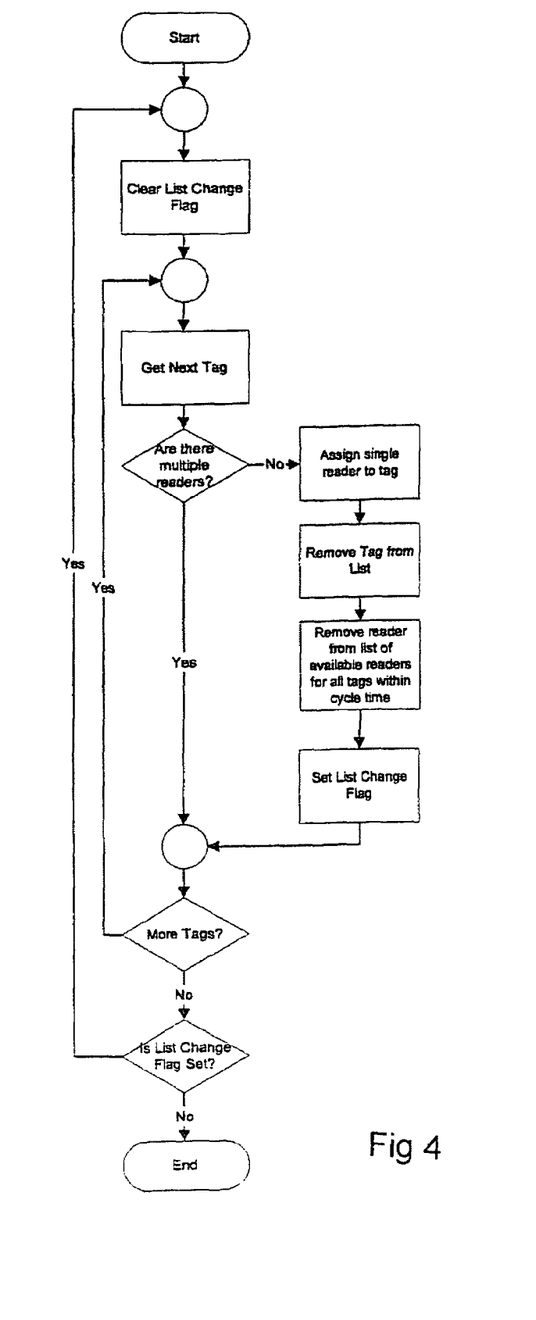
FIG. 4 is a single RFID reader elimination subroutine in the flow chart of FIG. 2.

A logical pyramid is diagrammatically illustrated in FIG. 1 by way of example, which is not intended to be limiting. A logical pyramid such as illustrated in FIG. 1 may be applied, so as to apply business rules for a particular application to collected data. Tn the example herein, the logical pyramid is applied to data collected from RFID tags and readers and incorporating business rules for the postal handling example. The logic for implementing the postal handling example is embedded in the software such as the illustrated algorithm of FIGS. 2-4, so tat it is possible to resolve detection of multiple tags to a unique traffic transaction "event " between an RFID reader and a unique RFID tag. The postal handling example of how this could be implemented is illustrated in FIGS. 2, 3 and 4, which presents a software flowchart for an implementation using RFID readers which interrogate RFID tags ("reader-talks-first" RFID tags) for example using motion detecting sensors with a plurality of RFID readers in the same workspace. The software algorithm in a sense culls out the readers and tags which are not involved in a traffic transaction involving multiple readers and/or multiple detected tags and so does not need resolving and ten moves on to resolve using weighted data sets traffic transactions which do involve multiple readers and/or multiple detected tags.

Figures 5, 5A:
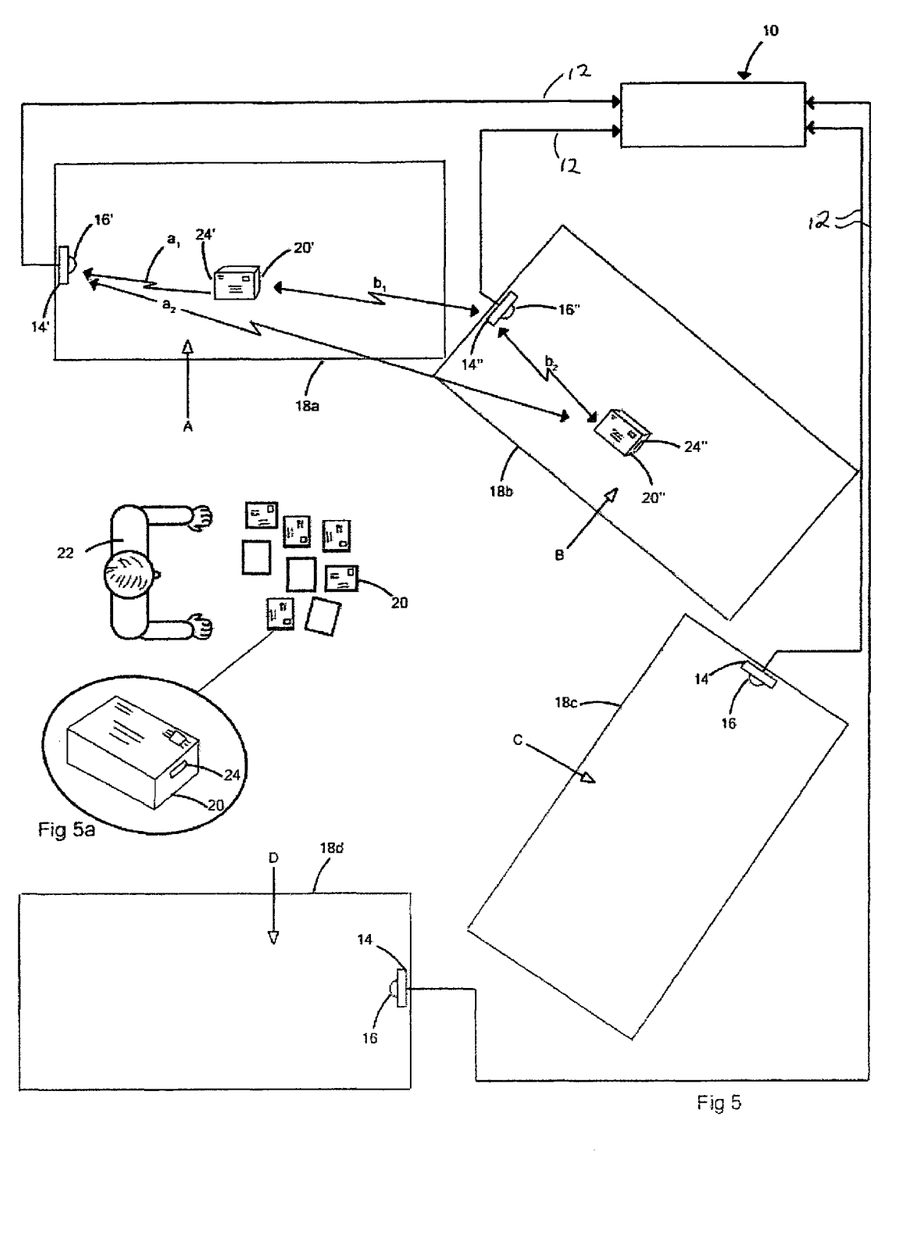
FIG. 5 is, in plan view, a representation of the example given in the present application of a postal worker sorting packages into bulk containers wherein the correct placement of packages into the correct container is the subject of automatic validation according to the method of the present invention.
FIG. 5a is an enlarged perspective view of a portion of FIG. 5.
Figures 6, 6A:
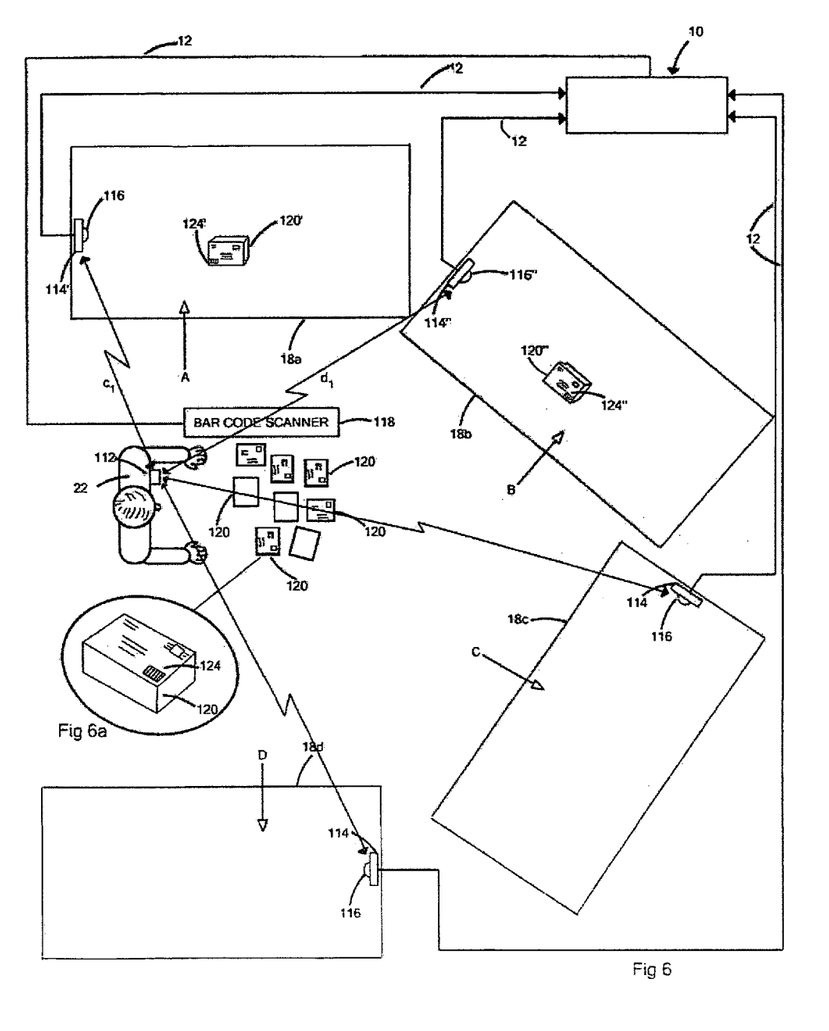
FIG. 6 is, in plan view, an alternative embodiment of FIG. 5.
FIG. 6a is an enlarged perspective view of a portion of FIG. 6.

Two examples of a postal worker sorting packages are illustrated in FIGS. 5 and 6. The examples are not intended to be limiting.

In the example of FIG. 5, a processor 10 is programmed to receive data via network 12 from RFID readers 14, 14' and 14", where in one embodiment each reader is also equipped with a motion detector sensor 16.

Each of bins 18a, 18b, 18c, and 18d is equipped with at least a single RFID reader 14 into which packages 20 may be deposited by a postal worker 22 in directions A, B, C or D corresponding to individual bins 18a-18d.

Packages 20 are sorted according to the destination to which they are to be sent by postal worker 22 depositing for example a package 20' into bin 18a so as to bring an RFID tag 24 mounted to the package into the read range radius of the corresponding RFID reader 14.

RFID reader 14' mounted in bin 18*a* detects the presence of package 20' for example by reason of it triggering corresponding motion detector sensor 16'. This piece of data is stored within memory within processor 10. RFID reader 14' also reads the radio frequency signal from RFID tag 24' mounted on package 20'. Package 20' is a distance $a_1$ from RFID reader 14'. Consequently, RFID reader 14' detects a signal strength from RFID tag 24' which is inversely proportional to distance $a_1$. As RFID reader 14' cyclically interrogates RFID tag 24', the presence of RFID tag 24' is repeatedly recorded, each successful interrogation identifying RFID tag 24' being recorded within processor 10 by an incrementally increasing scan count. The corresponding clock time corresponding to the successful identification of RFID tags 24' is also recorded as data corresponding to that tag. Consequently, data corresponding to at least these four variables, namely, motion detected (yes/no), radio frequency signal strength (variable), scan count (incremental count) and corresponding clock time (actual time), are recorded within processor 10 as detected by RFID reader 14' detecting the presence of RFID tag 24' on package 20'.

Simultaneously, if a package 20" has been deposited by postal worker 22 into bin 18*b*, RFID reader 14' will also detect RFID tag 24". Processor 10 will thus record data for package 20" as detected by RFID reader 14' according to the same four variables. In particular, motion detector sensor 16' will not have detected the presence of package 20" and so the sensor detection data for this variable corresponding to package 20" will be negative. The signal strength detected by RFID reader 14' corresponding to RFID tag 24" will be inversely proportional to the distance $a_2$ as measured between RFID reader 14' and RFID tag 24". Again the number of successful interrogations identifying RFID tag 24" will be recorded by an incrementally increasing corresponding scan count and the time of such successful interrogation will also be recorded.

Similarly, RFID reader 14" will detect the presence of both RFID tag 24' and RFID tag 24" on corresponding packages 20' and 20". The data collected by RFID reader 14" will be recorded by processor 10 and stored as data according to the same four variables but this time as read by RFID reader 14". Thus the motion detector sensor 16" associated with RFID reader 14" will have positively detected the presence of package 20" as package 20" is inserted in direction B by postal worker 22 into bin 18*b*, and thus the data will be a positive value for the motion corresponding to package 20". Conversely, motion detector sensor 16" will not have detected motion corresponding to package 20' because package 20' was not put into bin 18*b*, but was, rather, put into bin 18*a*. Thus the data for this variable for package 20' is negative. The signal strength recorded by RFID reader 14" from RFID tag 24" is inversely proportional to distance $b_2$ as measured between RFID reader 14" and RFID tag 24". Similarly, the signal strength read by RFID reader 14" from RFID tag 24' is inversely proportional to distance $b_1$ measured between RFID reader 14" and RFID tag 24'. As with RFID reader 14', RFID reader 14" repeatedly interrogates and records the successful interrogation of RFID tag 24" resulting in corresponding incrementally increased scan counts and the recording of the time of such successful interrogations.

The recording and tallying of data according to the four variables continues for all packages having RFID tags sensed by all of the RFID readers 14 so that a data base of data is maintained and updated for each detected RFID tag. The algorithm program in the software being implemented within processor 10, compares the weighted measured data (weighted from least important to most important as set out in FIG. 1) for each of the variables when taken cumulatively for each of the successfully interrogated RFID tags and selects the tag with the highest cumulative value as representing the tag with the highest probability of being associated with a particular RFID reader thereby automatically verifying that a particular package is in a desired bin.

In the example of FIG. 6 the worker wears the RFID reader and the RFID tags are on the bins, rather than on the packages. In particular, a processor 10 is programmed to receive data via network 12 from RFID reader 112 worn by worker 22. In this example each tag 114 is equipped with a motion detector sensor 116. Each of bins 18*a*, 18*b*, 18*c*, and 18*d* is equipped with at least a single RFID tag 114. Packages 120 may be deposited into the bins by a postal worker 22 in directions A, B, C or D corresponding to individual bins 18*a*, 18*b*, 18*c* or 18*d*.

Packages 20 are sorted according to the destination to which they are to be sent by postal worker 22 picking up a package 120 waiting to be sorted, and, firstly, scanning the package using a scanner such as bar code reader 118 to determine the unique identity of the particular package as encoded on its corresponding bar code label 124 seen in FIG. 6*a*. Memory within processor 10 stores this identity information. The package is then deposited into a bin destined for a location corresponding to the intended destination of the package. Thus a package 120' is deposited into bin 18*a* because the intended destination of package 120 corresponds to the destination of bin 18*a*.

RFID tag 114' mounted in bin 18*a* detects the presence of package 120' for example by reason of it triggering corresponding motion detector sensor 116'. This piece of data is correlated to the packages identity information and stored within memory within processor 10. RFID reader 112 reads the radio frequency signal from RFID tag 114'. Tag 114' is a distance $c_1$ from RFID reader 112. Consequently, RFID reader 112 detects a signal strength from RFID tag 114' which is inversely proportional to distance $c_1$. As RFID reader 112 cyclically interrogates RFID tag 114', the presence of RFID tag 114' is repeatedly recorded, each successful interrogation identifying RFID tag 114' being recorded within processor 10 by an incrementally increasing scan count. The corresponding clock time corresponding to the successful identification of RFID tags 114' is also recorded as data corresponding to that tag and thus correlated to the particular package 120'. Consequently, data corresponding to at least these four variables are recorded within processor 10 as detected by RFID reader 112 correlating to the identity of package 120' and thereby confirming the presence of package 120' in bin 18*a*.

If a package 120" has next been deposited by worker 22 into bin 18*b*, RFID reader 112 will also detect RFID tag 114" signalling that it has detected the presence of package 120" by the triggering of the corresponding motion detector 116" on tag 114". Processor 10 will thus record data for package 120" as detected by RFID reader 112 according to the same four variables. In particular, motion detector sensor 116' will not have detected the presence of package 120" while sensor 116" will have detected its presence. Because package 120" was scanned on scanner 118 following scanning of package 120', sensor detection data from tag 120" will be correlated to package 120". The signal strength detected by RFID reader 112 corresponding to RFID tag 114" will be inversely proportional to the distance $d_2$ as measured between RFID reader 112 and RFID tag 114". Again the number of successful interrogations identifying RFID tag 114" will be recorded by an incrementally increasing corresponding scan count and the time of such successful interrogation will also be recorded and stored in processor 10 as correlating to package 120".

The recording and tallying of data according to the four variables continues for all packages being scanned on scanner 118 and detected by the RFID tags in the various bins so that a data base of data is maintained and updated for each detected package. The algorithm program in the software being implemented within processor 10, compares the weighted measured data for each of the variables when taken cumulatively for each of the successfully interrogated RFID tags and selects the tag with the highest cumulative value as representing the tag with the highest probability of being associated with a particular package thereby automatically verifying that the particular package is in the desired bin.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for resolving RFID-based object traffic transactions to a single container in the presence of a plurality of containers comprising the steps of:
   a) monitoring RFID object traffic transactions to a single container amongst a plurality of containers wherein said traffic transactions are between at least one RFID reader and a plurality of detected RFID tags detected by said at least one RFID reader,
   b) calculating a cumulative and weighted data set for each detected RFID tag of said RFID tags,
   c) comparing said data set for said each detected RFID tag with said data set for other of said detected RFID tags and identifying one RFID tag of said detected RFID tags having a greatest cumulative weight calculated for its corresponding said data set so as to resolve multiple detections and identifications of said detected RFID tags in said object traffic transactions to said single container, wherein said data set includes the following data for said each detected RFID tag: radio frequency signal strength, an incremental count of the number of said RFID tag detections and identifications, and the corresponding clock time for each count in said incremental count,
and wherein said data is, in order of most important to least important, weighted by said signal strength, said incremental count, and said corresponding clock time.

2. The method of claim 1 further including the step of mounting said at least one RFID reader on at least one container of the plurality of containers.

3. The method of claim 1 further including the step of mounting said at least one RFID reader adjacent a person sorting objects into the plurality of containers, and mounting said RFID tags on the plurality of containers.

4. The method of claim 1 further including the step of adding to said data set data from an object detection sensor.

5. The method of claim 4 further including the step of mounting said object detection sensor on each of said at least one RFID reader.

6. The method of claim 1 further including the step of mounting an object detection sensor on each of said RFID tags.

7. The method of claim 4 wherein said object detection sensor is a motion detector.

8. The method of claim 1 wherein said at least one RFID reader interrogates said RFID tags for said identification of said tags.

9. A system for resolving RFID-based object traffic transactions to a single container in the presence of a plurality of containers comprising:
   a) at least one RFID reader and a plurality of RFID tags detectable by said at least one RFID reader,
   b) means for monitoring RFID object traffic transactions to a single container amongst a plurality of containers wherein said traffic transactions are between at least one RFID reader and a plurality of detected RFID tags detected by said at least one RFID reader,
   c) processor means for calculating a cumulative and weighted data set for each detected RFID tag of said RFID tags,
   d) processor means for comparing said data set for said each detected RFID tag with said data set for other of said detected RFID tags and identifying one RFID tag of said detected RFID tags having a greatest cumulative weight calculated for its corresponding said data set so as to resolve multiple detections and identifications of said detected RFID tags in said object traffic transactions to said single container, wherein said data set includes the following data for said each detected RFID tag: radio frequency signal strength, an incremental count of the number of said RFID tag detections and identifications, and the corresponding clock time for each count in said incremental count,
and wherein said data is, in order of most important to least important, weighted by said signal strength, said incremental count, and said corresponding clock time.

10. The system of claim 9 wherein said at least one RFID reader is mounted on at least one container of the plurality of containers.

11. The system of claim 9 wherein said at least one RFID reader is mounted adjacent a person sorting objects into, and said RFID tags are mounted on, a plurality of containers.

12. The system of claim 9 wherein said data set includes data from an object detection sensor.

13. The system of claim 12 wherein said object detection sensor is mounted on each of said at least one RFID reader.

14. The system of claim 9 wherein said an object detection sensor is mounted on each of said RFID tags.

15. The system of claim 12 wherein said object detection sensor is a motion detector.

16. The system of claim 9 wherein said at least one RFID reader interrogates said RFID tags for said identification of said tags.

* * * * *